United States Patent [19]

Baskett

[11] 4,113,023
[45] Sep. 12, 1978

[54] MULTIPLE SHAFT, GROUND-RAKING ATTACHMENT FOR BUCKET-EQUIPPED TRACTORS

[76] Inventor: Theodore N. Baskett, 9514 Portland Ave., Tacoma, Wash. 98445

[21] Appl. No.: 747,966

[22] Filed: Dec. 6, 1976

[51] Int. Cl.² .................................. A01D 19/02
[52] U.S. Cl. ........................... 171/63; 171/19; 171/98; 37/8
[58] Field of Search ............... 171/63, 19, 98; 37/4, 37/5, 7, 8, 9, 12, 22, 24

[56] References Cited
U.S. PATENT DOCUMENTS

| | | | |
|---|---|---|---|
| 2,938,586 | 5/1960 | Goffney | 171/63 |
| 3,210,868 | 10/1965 | Liess | 37/8 |
| 3,637,024 | 1/1972 | Baskett | 171/63 |
| 3,643,355 | 2/1972 | Eiger | 37/8 |

Primary Examiner—Russell R. Kinsey
Attorney, Agent, or Firm—Eugene D. Farley

[57] ABSTRACT

A ground-raking attachment adapts bucket-equipped tractors for raking a ground surface free of rocks, refuse, roots, sticks and other debris. The attachment includes a frame and means for pivotally mounting the frame on a tractor bucket. The frame mounts at least one pair of motor driven, rotatable shafts mounting a plurality of rake teeth arranged for raking debris from the ground and progressively advancing it into the bucket. A frame drive is connected to the bucket for angularly adjusting it to selected positions relative to the ground.

13 Claims, 10 Drawing Figures

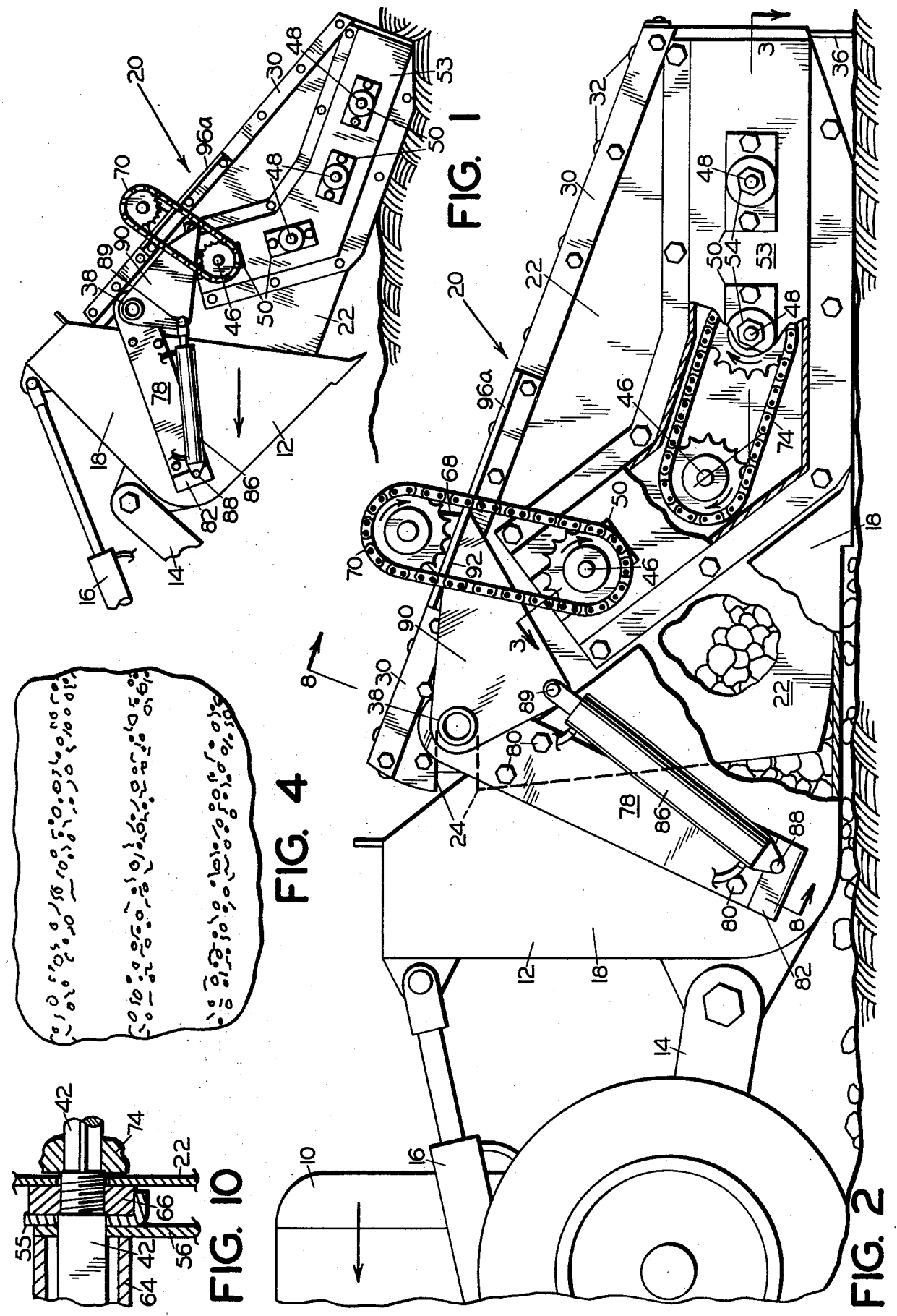

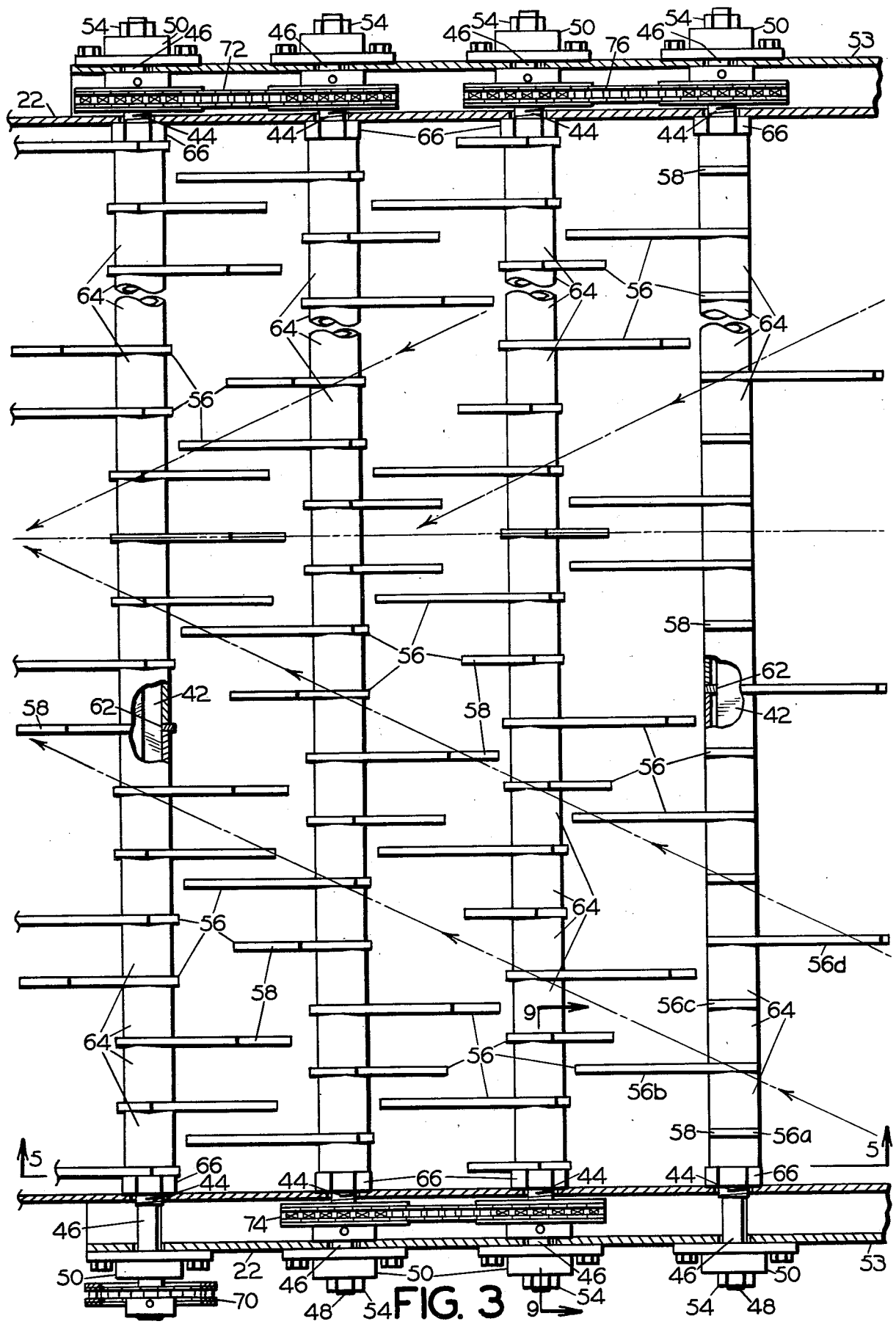

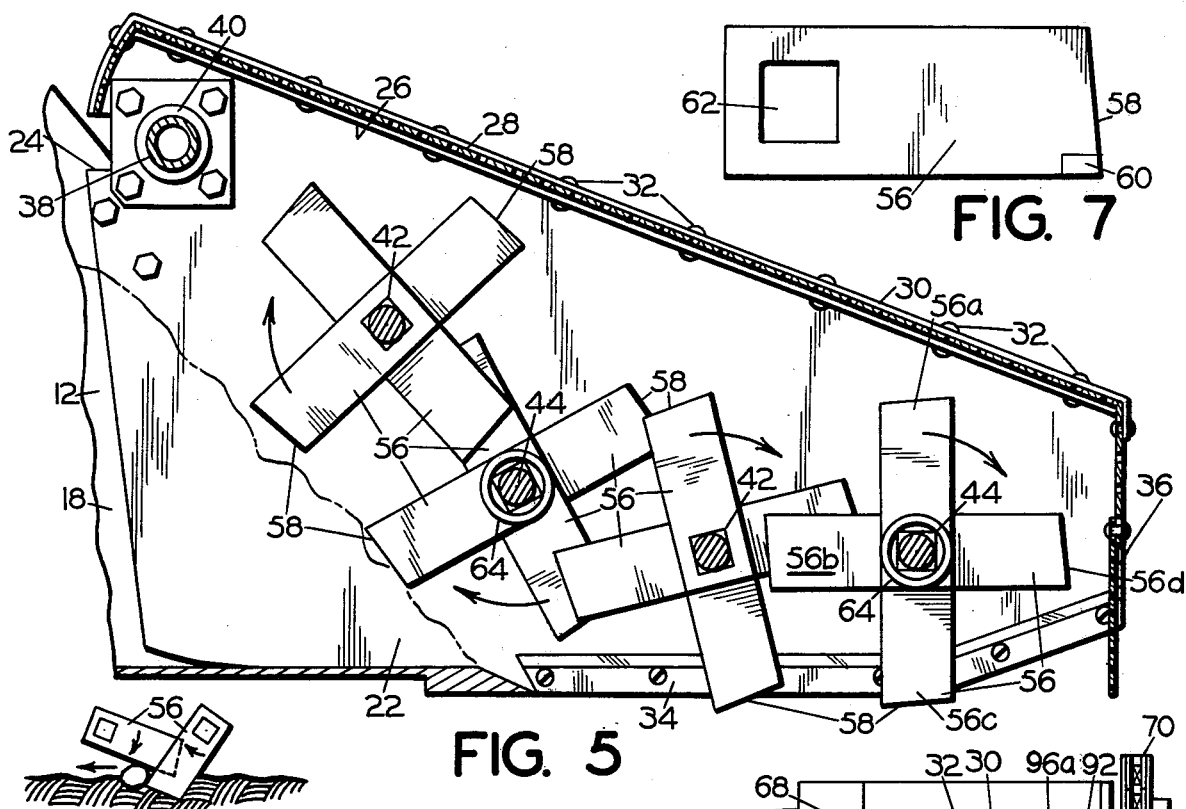
FIG. 5
FIG. 7
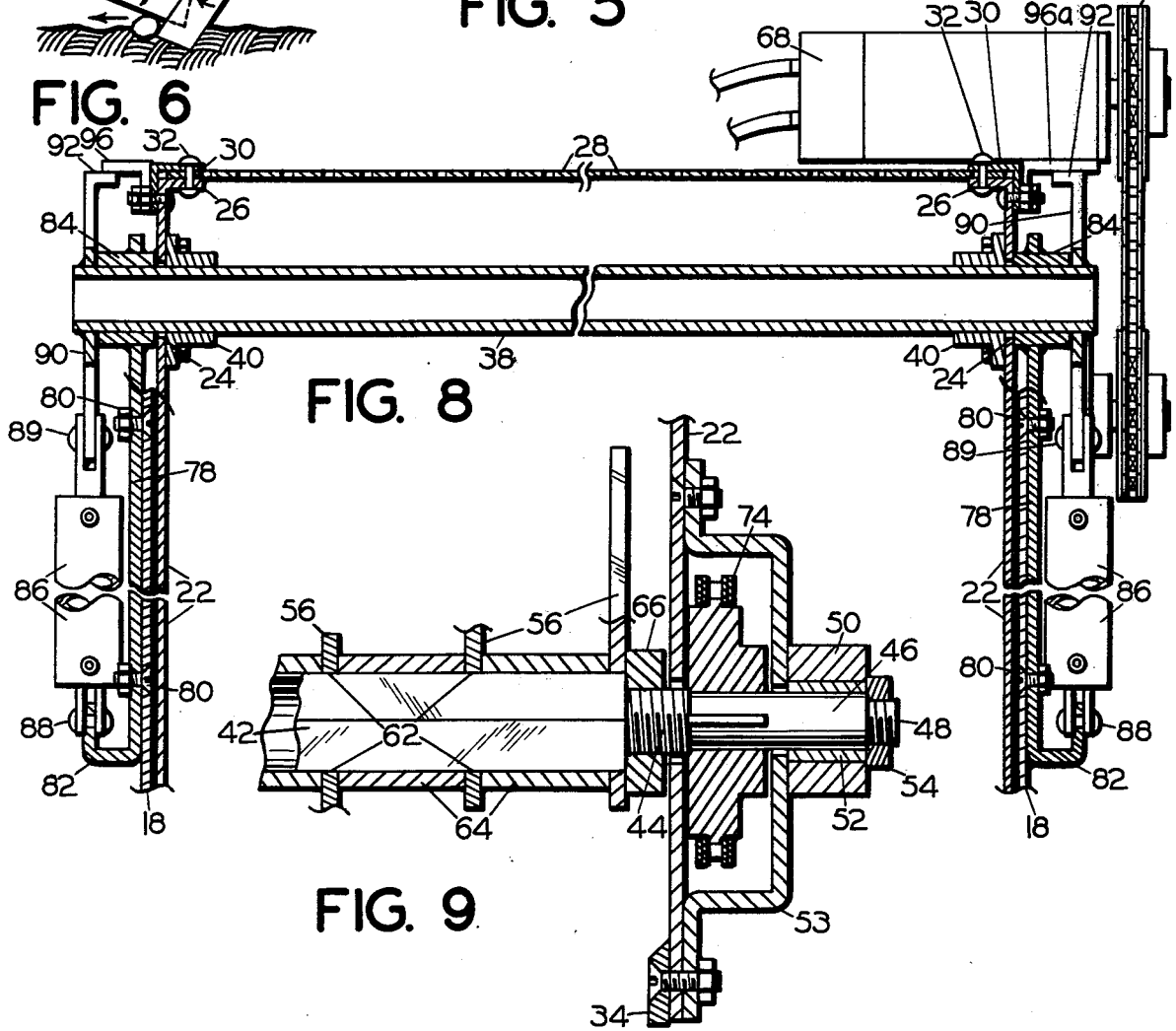
FIG. 6
FIG. 8
FIG. 9 as the shafts, the teeth on one shaft meshing with the teeth of the other.

A shaft drive is connected to the shafts for rotation them in timed relation to each other, thereby advancing material engaged by the teeth progressively into the bucket. A frame drive is connected to the frame for shifting it between various positions of angular adjustment as required to adjust the attachment to selected positions for digging and raking.

MULTIPLE SHAFT, GROUND-RAKING ATTACHMENT FOR BUCKET-EQUIPPED TRACTORS

BACKGROUND AND GENERAL STATEMENT OF THE INVENTION

This invention relates to ground-raking attachments for bucket-equipped tractors. It pertains particularly to attachments for bucket-equipped, front end loader-type tractors, of the class described in my prior patent U.S. Pat. No. 3,637,024, which adapt the tractor to raking the ground and transferring rocks and other litter from the surface of the ground to the bucket of the tractor.

In the construction industry there is needed tractor-mounted apparatus for removing debris from the construction site, for leveling the site, and for preparing the ground for seeding with grass seed. In gardening and farming there exists a need for tractor-mounted apparatus which will remove sticks, roots, and small rocks from ground to be planted, and which will otherwise prepare the ground for seeding with a selected crop.

It is the general purpose of the present invention to provide such an apparatus having the following objects and advantages:

It is easily and detachably mountable on conventional tractors of the front end loader type without extensive modification thereof.

It operates efficiently in conditioning the ground and raking solid debris into the bucket of the tractor.

When changing locations or when emptying the bucket it may be hoisted out of the way, whereupon the tractor and bucket may be operated in a normal manner.

It works rapidly, an operating speed of 60 lineal feet per minute easily being obtainable.

It is versatile in its application to the removal of debris of various categories including rocks, brush, pieces of wood and metal and glass objects.

It is versatile in its application to terrain of different grades and condition.

It is operable on both wet and dry ground.

It is provided with a floating suspension which enables it to accommodate ground irregularities without damage to the apparatus.

It does not become tangled and fouled when raking roots, sod, and like difficult-to-rake materials.

It urges rocks toward the center of the apparatus for easy loading into the tractor bucket, preventing the rocks from hanging up or jamming the apparatus.

It is fitted with raking teeth which are easily removed for replacement when worn.

It is adjustable to various raking and digging positions.

It is readily visible to the operator and shielded efficiently for safe operation.

It is provided with intermeshing teeth which are self-cleaning.

It is relatively simple in construction, inexpensive to manufacture, and easily attached to and detached from conventional tractors of the front end loader type.

In its broad aspect, the hereindescribed tractor-mounted, ground-raking attachment comprises a frame including a pair of spaced side members, and frame mounting means mounting the frame on a tractor bucket. At least one pair of rotatable shafts is mounted rotatably between the frame side members in substantially parallel spaced relation to each other. A plurality of rake teeth are mounted radially on the shafts, the teeth on one shaft meshing with the teeth of the other.

DESCRIPTION OF A PREFERRED EMBODIMENT OF THE INVENTION

The construction and manner of operation of the hereindescribed ground-raking attachment for bucket-equipped tractors is illustrated in the following drawings, wherein:

FIG. 1 is a view in side elevation of the attachment, mounted on a tractor in a ground-digging posture.

FIG. 2 is a view in side elevation, partly broken away, of the attachment mounted on a tractor, illustrating the attachment in a ground-raking posture.

FIG. 3 is a fragmentary, foreshortened, enlarged plan view of the attachment, looking in the direction of the arrows of line 3—3 of FIG. 2.

FIG. 4 is a fragmentary plan view of the ground surface after application of the attachment, illustrating the manner in which rocks and other debris are windrowed by the apparatus in a digging pass with the apparatus in the posture of FIG. 1, preliminary to collecting them in a raking pass, with the apparatus in the posture of FIG. 2.

FIG. 5 is a vertical section taken along line 5—5 of FIG. 3.

FIG. 6 is a schematic view in elevation illustrating the action of the raking teeth of the attachment in advancing a rock into the tractor bucket while contemporaneously wiping each other for removal of debris.

FIG. 7 is a detail plan view of a raking tooth.

FIG. 8 is a foreshortened, fragmentary, transverse, sectional view taken along line 8—8 of FIG. 2.

FIG. 9 is a fragmentary, detail, sectional view taken along line 9—9 of FIG. 3 and illustrating the construction and manner of mounting the digging and raking elements of the attachment and FIG. 10 is a fragmentary, detail, sectional view illustrating an alternate manner of mounting the teeth of the digging and raking elements of the attachment, to compensate for wear.

Referring to FIGS. 1 and 2:

The ground-raking attachment of my invention is adapted for use with a tractor 10 of the front end loader type equipped with a bucket 12. The bucket is pivotally mounted on forwardly extending arms 14 of the tractor and is operated by fluid driven cylinders 16 in the usual manner. The bucket is of conventional construction and includes a pair of spaced side walls 18. Its forward end is open.

The hereindescribed attachment, indicated generally at 20, is mounted on the bucket and has for its functions first digging up and loosening rocks and other debris from the ground; second, smoothing the ground; and third, raking up the debris and loading it into the bucket.

The attachment is mounted on a frame which includes a pair of spaced side members such as side plates 22. These are of substantial length and extend forwardly of the bucket a substantial distance. Their inner ends are received within the bucket in the manner shown in FIG. 2.

The inner ends of the plates have aligned openings 24, FIG. 8, and their upper margins are bent inwardly to form flanges 26. A metal shield 28 preferably foraminous as illustrated and having a down turned forward end is supported on the flanges and retained demountably by means of angle irons 30 and bolts 32.

Reinforcing bars 34 stiffen the lower margins of the side plates, FIG. 5, and a forwardly-located, flexible flap 36 further shields the attachment.

The frame assembly 22-36 thus constituted is mounted for angular movement in the vertical plane on a pivot shaft 38, FIGS. 5 and 8. In the illustrated form of the invention the pivot shaft comprises a substantial pipe which is mounted in openings 24 in side plates 22. It extends outwardly beyond the planes of the side plates on each side. Bearings 40 bolted to the inner faces of the side plates journal the pivot shaft.

At least one pair of rotatable shafts with associated raking teeth is rotatably mounted between frame side plates 22. In the illustrated form of the invention there are two pairs of such shafts: a substantially horizontally arranged downstream pair; and an upstream pair arranged on an upwardly inclined plane. As is apparent in FIG. 5, the downstream pair advances the material in the direction of the bucket, while the upstream pair advances it vertically and deposits it on a bed of material contained in the bucket.

The construction of the rotary shaft-rake tooth assemblies is shown particularly in FIGS. 3, 5, and 9.

Each assembly includes a shaft 42 which preferably is non-circular in cross section. As shown, it is square in cross section and provided on each end with extensions which are round in cross section. Each round extension includes a threaded segment 44, an unthreaded segment of reduced diameter 46, and a threaded segment of still further reduced diameter 48, FIG. 9.

The outer portion of shaft segment 46 is received in a bearing 50 fitted with bushing 52. Bearings 50 are mounted on a substantial housing 53 bolted to side plates 22. A nut 54 on each end of the shaft locks the assembly in place.

Removably mounted on each of rake shafts 42 are a plurality of rake teeth 56.

As shown in FIG. 7, each rake tooth comprises a flat bar 56. The bar is substantially rectangular in outline, although its working edge 58 is slightly angled and mounts a hardened wear insert 60. The shank end of the bar is provided with a squared opening 62 dimensioned for a snug sliding fit over square shaft 42.

Spacers 64, also rectangular in cross section, space the teeth from each other. Nuts 66 threaded onto the threaded sections 44 of each shaft clamp the spacers and teeth together in an assembly which is easily disassembled for the replacement of worn or broken teeth, FIG. 9. A combination shim and nut lock 55, FIG. 10, both takes up slack in the assembly and locks nut 66 against rotation.

There thus is provided a shaft-tooth assembly which lies a spaced longitudinal distance from a companion assembly with which its teeth intermesh in rock-advancing, tooth-wiping relationship. Furthermore, as seen particularly in FIGS. 3 and 5, the teeth on each shaft alternate in position to create a spiral tooth arrangement when the assembly is viewed axially and in depth.

Thus, in the right hand assembly of FIG. 3, tooth 56a is in the up position, tooth 56b in the forward position, tooth 56c in the downward position, and tooth 56d in the rearward or trailing position. This sequence is continued the length of the shaft to provide a spiraled arrangement which is effective in moving rocks and other articles handled not only in the direction of the bucket, but also centrally toward the middle of the bucket, as indicated by the arrows of FIG. 3.

This moves the rocks away from the side walls of the attachment and prevents them from jamming between the side walls and teeth. It also forms them into windrows, FIG. 4, when the bucket is in the elevated position of FIG. 1, or loads them centrally into the bucket when the bucket is in the lowered position of FIG. 2, as will appear more fully hereinafter.

Drive means is provided for driving the shaft-tooth assemblies in timed relation to each other as required to move the rake teeth in the proper operating sequence.

A rotary motor, preferably a rotary hydraulic motor 68, is mounted on flange 96a of one of side plates 22, FIGS. 2 and 8.

The shaft of motor 68 is coupled through a chain and sprocket assembly 70 to the shaft of the upstream one of the shaft tooth assemblies, as viewed in FIG. 3. This shaft in turn drives the downstream shafts through the chain and sprocket assemblies 72, 74, 76. All of the shafts and the teeth mounted thereon accordingly move together in a strictly determined time sequence.

Frame elevating means is provided for shifting the angular position of the frame and the rotary shaft-tooth assemblies which it mounts to selected positions of vertical adjustment. The drive for accomplishing this is illustrated particularly in FIGS. 2 and 8.

A pair of support bars 78 is bolted in substantially aligned relation one on each side face of opposed plates 22. The support bars overlie the side plates in a generally vertical but rearwardly inclined position in which their upper ends extend above the plane of the open end of the bucket.

The support bars are secured to the bucket side plates by suitable means such as bolts 80. Such a mounting makes it possible to mount and demount the raking assembly from the bucket at will. Furthermore, multiple holes, or slots, may be provided in the side plates 18 of the bucket for mounting the support bars at various elevations as required to position the raking attachments suitably for different terrain.

The lower ends of support bars 78 have outwardly directed reverse bends 82. Their upper ends are provided with bearings 84.

Bearings 84 journal pivot shaft 38. Reverse bends 82 provide brackets for mounting the drive for the assembly.

A preferred drive comprises the fluid-cylinder-operated drive shown in FIGS. 2 and 8.

Fluid cylinders, preferably hydraulic cylinders 86, one on each side of the rake attachment, have their cases pivotally mounted to brackets 82 by means of bolts 88. The piston rods of the cylinders are coupled by means of pins 89 to lift plates 90.

The latter members of the drive assembly comprise substantially flat plates having bearing surfaces 92. The plates are welded to each end of shaft 38.

Bearing surfaces 92 of the lift plates work against angle irons 96, 96a bolted to the upper margins of side plates 22. When the cylinders 86 are extended, plates 90 move with shaft 38 with bearing surfaces 92 bearing against angle irons 96, 96a and accordingly elevating the rake assembly to the desired height. Upon reversing the cylinders, or by gravitational action, the reverse movement occurs.

OPERATION

The operation of my ground-raking tractor attachment is as follows:

In preparing ground for seeding, the two-pass operations of FIGS. 1 and 2 may be carried out. In the first pass the ground is worked to a selected depth. Rocks, roots, and other debris are dug out of the ground, and conveyed centrally of the apparatus as indicated by the converging dashed lines of FIG. 3. They then are deposited in windrows as illustrated in FIG. 4. In this pass, the bucket 18 of the tractor is elevated and tilted as shown in FIG. 1, as it is not used for collection.

In the second pass, the apparatus is drawn along the windrows of FIG. 4 and is used to collect the debris. In this operation the bucket is lowered and adjusted to its FIG. 2 debris-collecting position. As the attachment is drawn along the windrows, the debris is pushed progressively into the bucket by operation of the rake teeth which not only load the debris into the bucket but also lift it vertically as required to fill the bucket substantially completely, as shown in FIG. 5.

In both operations the actions of FIGS. 3 and 6 occur. As shown in FIG. 3, the spiral disposition of the teeth on the shafts moves the debris centrally so that it does not jam against the side walls of the attachment but rather is urged progressively toward the central portion of the bucket.

As shown in FIG. 6, the shafts are positioned relative to each other, and the teeth on each shaft are positioned relative to each other in such a manner that a two-fold action occurs. First, as the leading tooth leaves the ground and hence disengages from a rock or other item of debris, the next following tooth enters the ground and engages the rock so that the rock is advanced progressively without being lost. Second, as the shafts rotate, the teeth mesh with each other so that as the right hand tooth of FIG. 6 moves upwardly the left hand tooth of that figure moves downwardly and wipes it free of entangling material such as roots and vines. The apparatus thus is self-cleaning.

Having thus described my invention in preferred embodiments, I claim:

1. For use with a tractor having a material handling bucket including a pair of spaced side walls and an open fron end, a ground-raking attachment comprising:
  (a) a frame including a pair of spaced side members,
  (b) frame mounting means mounting the frame on the bucket,
  (c) at least one pair of rotatable shafts,
  (d) shaft mounting means rotatably mounting the shafts between the frame side members in substantially parallel, spaced relation to each other,
  (e) a plurality of rake teeth,
  (f) rake tooth mounting means mounting the teeth radially on the shafts, the teeth on one shaft meshing with the teeth on the other, and
  (g) drive means connected to the shafts for rotating them in timed relation to each other for advancing material engaged by the teeth progressively into the bucket.

2. The ground raking attachment of claim 1 wherein the rake tooth mounting means includes tooth spacing means spacing the teeth axially on each shaft for wiping the teeth on one shaft with the teeth of the other during rotation of the shafts.

3. The ground raking attachment of claim 1 including an infeed pair and an outfeed pair of rotatable shafts with rake teeth mounted thereon, the shaft mounting means mounting the infeed pair in a substantially horizontal plane and the outfeed pair in an upwardly inclined plane.

4. The ground raking attachment of claim 1 wherein the shafts are angular in cross section and wherein the rake teeth comprise flat plates having in their shank portions angular openings mounting the teeth on the shafts.

5. The ground raking attachment of claim 1 wherein the shafts are square in cross section and the rake teeth comprise flat plates having square openings in their shank portions for mounting the teeth on the shafts at substantially 90° angles to each other, the rake tooth mounting means including a plurality of spacers mountable on the shafts between the teeth for spacing the teeth a predetermined axial distance from each other.

6. The ground raking attachment of claim 5 wherein the teeth and spacers are freely slidable on the shaft and including clamp means on the ends of the shaft bearing against the teeth for clamping the teeth and spacers on the shaft.

7. The ground raking attachment of claim 1 wherein the frame mounting means comprises pivotal frame mounting means pivotally mounting one end of the frame on the bucket.

8. The ground raking attachment of claim 1 wherein the frame mounting means comprises a pair of support bars, support bar mounting means mounting the support bars on the side walls of the bucket and extending outwardly from the open front end thereof, and a pivot shaft mounted between the ends of the support bars and journaling the ends of the frame side members.

9. The ground raking attachment of claim 8 including frame adjusting means connected to the frame for adjusting it in selected angular positions relative to the bucket.

10. The ground raking attachment of claim 9 wherein the frame adjusting means comprises fluid operated cylinder means.

11. The ground raking attachment of claim 9 wherein the frame adjusting means comprises a fluid operated cylinder and driven lift plate means driven thereby.

12. The ground raking attachment of claim 9 wherein the frame adjusting means comprises a fluid operated cylinder including a case and a ram, a lift plate mounted on the pivot shaft and working against the frame, and pivotal coupling means coupling the cylinder case and ram to the support bar and lift plate.

13. For use with a tractor having a material-handling bucket including a pair of spaced side walls and an open front and, a ground-raking attachment comprising:
  (a) a frame including a pair of spaced side members,
  (b) rake means mounted within the frame,
  (c) a pair of frame support bars,
  (d) support bar mounting means mounting the support bars on the side walls of the bucket with ends thereof projecting outwardly from the open front end of the bucket,
  (e) a pivot shaft mounted between the outwardly extending ends of the support bars, and journaling an end of the frame, and
  (f) frame adjusting means connected to the frame for moving it between selected positions of angular adjustment about the pivot shaft, the frame adjusting means comprising a lift plate mounted on the pivot shaft and releasably engaging the frame, a fluid operated cylinder, and pivotal coupling means coupling one end of the cylinder to the support bar and the other to the lift plate.

* * * * *